(12) United States Patent
Ji et al.

(10) Patent No.: US 8,890,816 B2
(45) Date of Patent: Nov. 18, 2014

(54) INPUT SYSTEM AND RELATED METHOD FOR AN ELECTRONIC DEVICE

(75) Inventors: Thomas Ji, Taipei Hsien (TW);
Wei-Dong Shi, Taipei Hsien (TW);
Tomy Liu, Taipei Hsien (TW);
Hou-Cheng Chen, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 569 days.

(21) Appl. No.: 12/607,976

(22) Filed: Oct. 28, 2009

(65) Prior Publication Data

US 2010/0182240 A1    Jul. 22, 2010

(30) Foreign Application Priority Data

Jan. 19, 2009  (TW) ................................ 98101875 A

(51) Int. Cl.
| | | |
|---|---|---|
| *G06F 3/02* | (2006.01) | |
| *G06F 3/042* | (2006.01) | |
| *G06F 3/0354* | (2013.01) | |
| *G06F 3/0488* | (2013.01) | |

(52) U.S. Cl.
CPC .......... *G06F 3/04886* (2013.01); *G06F 3/0426* (2013.01); *G06F 3/03545* (2013.01)
USPC .......................................... 345/168; 345/179

(58) Field of Classification Search
USPC ....................................................... 345/168
See application file for complete search history.

(56) References Cited

U.S. PATENT DOCUMENTS

| | | | |
|---|---|---|---|
| 4,572,688 A * | 2/1986 | Klose ............................. | 401/112 |
| 5,712,658 A * | 1/1998 | Arita et al. .................... | 345/158 |
| 6,100,538 A * | 8/2000 | Ogawa ...................... | 250/559.29 |
| 6,265,993 B1 | 7/2001 | Johnson | |
| 6,266,236 B1 * | 7/2001 | Ku et al. ................... | 361/679.27 |
| 6,538,645 B1 * | 3/2003 | Juang et al. .................... | 345/179 |
| 6,766,036 B1 * | 7/2004 | Pryor ............................. | 382/103 |
| 7,151,530 B2 * | 12/2006 | Roeber et al. ................. | 345/168 |
| 7,758,264 B2 * | 7/2010 | Jawerth et al. ................ | 400/489 |
| 2002/0163511 A1 * | 11/2002 | Sekendur ....................... | 345/179 |
| 2003/0165048 A1 * | 9/2003 | Bamji et al. .................. | 361/681 |
| 2004/0032398 A1 * | 2/2004 | Ariel et al. .................... | 345/168 |
| 2006/0190836 A1 * | 8/2006 | Ling Su et al. ............... | 715/773 |
| 2007/0154116 A1 * | 7/2007 | Shieh ............................. | 382/314 |
| 2008/0018591 A1 * | 1/2008 | Pittel et al. .................... | 345/156 |
| 2008/0259053 A1 * | 10/2008 | Newton ......................... | 345/175 |
| 2008/0278462 A1 * | 11/2008 | Chang ........................... | 345/179 |

OTHER PUBLICATIONS

Office action mailed on Jun. 23, 2011 for the China application No. 200910001107.7, p. 4 line 20~30 and p. 5 line 1~9.
Office action mailed on Jul. 25, 2012 for the Taiwan application No. 098101875, p. 2 line 7-26, p. 3 line 1-10.

* cited by examiner

*Primary Examiner* — Alexander S Beck
*Assistant Examiner* — Mihir Rayan
(74) *Attorney, Agent, or Firm* — Winston Hsu; Scott Margo

(57) ABSTRACT

An input system for an electronic device including a main body includes an input device installed outside of the main body, comprising a plurality of input units denoted by a plurality of corresponding input symbols, a control device installed outside of the main body for pressing at least one of the plurality of input units for generating an indication signal, a camera for taking an image of the control device pressing the input unit, the image including the indication signal, and an image processing unit installed in the main body and coupled to the camera, for recognizing the pressed input unit according to a location of the indication signal in the image and generating input data corresponding to an input symbol denoting the pressed input unit.

18 Claims, 7 Drawing Sheets

INPUT SYSTEM AND RELATED METHOD FOR AN ELECTRONIC DEVICE

BACKGROUND OF THE INVENTION

1. Field of the Invention

The present invention relates to an input system and related method for an electronic device, and more particularly, to an input system and related method for taking an image of an input device being pressed and generating corresponding input data according to the image.

2. Description of the Prior Art

With the advancement in computer technology, electronic products, such as desktop computers, laptop computers, mobile phones or personal digital assistants (PDAs), are getting popular in modern life. These electronic products are developed to be small-sized and thin for user convenience and to have an attractive appearance.

Please refer to FIG. 1, which is a block diagram of an electronic device 10 according to the prior art. The electronic device 10 can be a computer, a mobile phone, or a PDA. The electronic device 10 includes a screen 100, a signal processing unit 102 and a keyboard 104. The signal processing unit 102 is coupled between the screen 100 and the keyboard 104. A user depresses keys of the keyboard 104 for generating input data. The signal processing unit 102 receives input data, processes input data, and outputs a processing result as words display or pages switch on the screen 100. In the electronic device 10, the keyboard 104 is a primary input interface and usually occupies a lot of space of a main body of the electronic device 10. However, when the keyboard 104 is miniaturized, inconvenience of use inevitably increases.

In addition, a smart phone integrating advantages of a PDA, a computer and a camera is becoming a market trend already. The smart phone has a keyboard with a large area for supporting complicated functions, which is similar to a computer. Therefore, it is a challenge to improve both functionality and size of a smart phone and similar electronic devices.

SUMMARY OF THE INVENTION

It is therefore a primary objective of the claimed invention to provide an input system and related method for an electronic device, for optimizing the appearance and the functionality of the electronic device.

The present invention discloses an input system for an electronic device including a main body. The input system comprises an input device, a control device, a camera, and an image processing unit. The input device is installed outside of the main body and comprises a plurality of input units denoted by a plurality of corresponding input symbols. The control device is installed outside of the main body, and is utilized for pressing at least one of the plurality of input units for generating an indication signal. The camera is utilized for taking an image of the control device pressing the input unit, wherein the image includes the indication signal. The image processing unit is installed in the main body and is coupled to the camera, and is utilized for recognizing the pressed input unit according to a location of the indication signal in the image and generating input data corresponding to an input symbol denoting the pressed input unit.

The present invention further discloses an electronic device comprising a screen, a signal processing unit and an input system. The screen is installed in a main body of the electronic device for displaying images. The signal processing unit is installed in the main body and is coupled to the screen, for processing input data and generating a processing result and outputting the processing result to the screen. The input system is coupled to the signal processing unit, and comprises an input device, a control device, a camera, and an image processing unit. The input device is installed outside of the main body and comprises a plurality of input units denoted by a plurality of corresponding input symbols. The control device is installed outside of the main body, and is utilized for pressing at least one of the plurality of input units for generating an indication signal. The camera is utilized for taking an image of the control device pressing the input unit, wherein the image includes the indication signal. The image processing unit is installed in the main body, coupled to the camera and the signal processing unit, and is utilized for recognizing the pressed input unit according to a location of the indication signal in the image, generating input data corresponding to an input symbol denoting the pressed input unit, and outputting the input data to the signal processing unit.

The present invention further discloses an input method for an electronic device, the electronic device comprising an input device including a plurality of input units denoted by a plurality of corresponding symbols. The input method comprises using a control device to press at least one of the plurality of input units, for generating an indication signal, taking an image of the control device pressing the input unit, the image including the indication signal, and recognizing the pressed input unit according to a location of the indication signal in the image, for generating input data corresponding to an input symbol denoting the pressed input unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
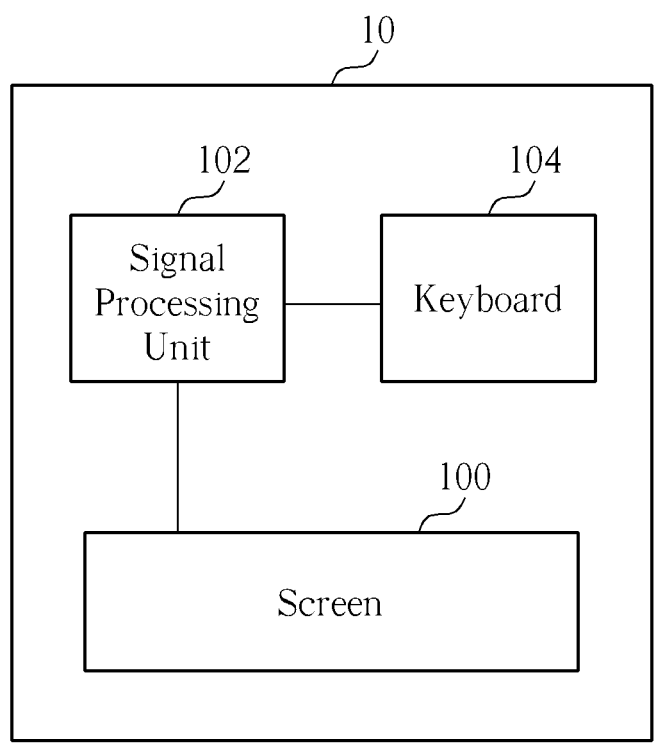
FIG. 1 is a block diagram of an electronic device according to the prior art.
Figure 2:
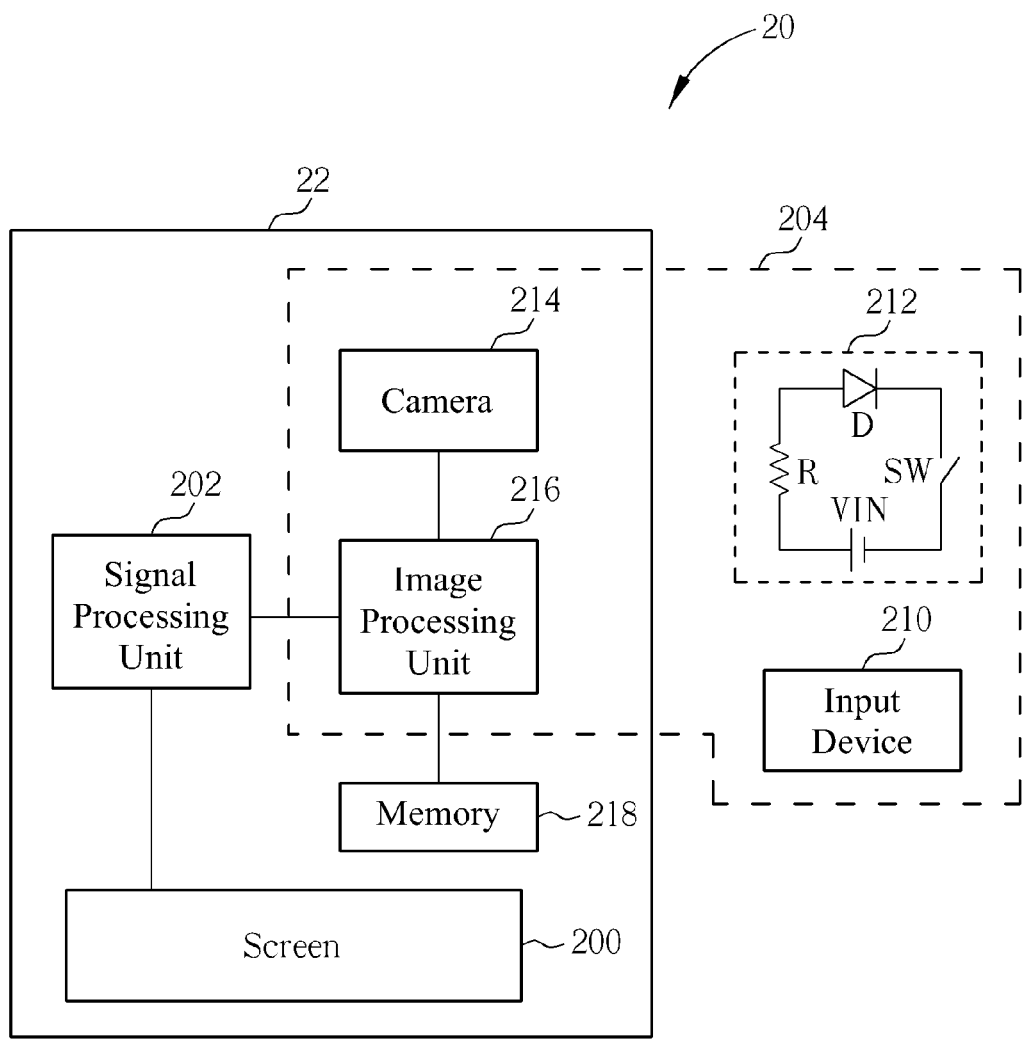
FIG. 2 is a block diagram of an electronic device according to an embodiment of the present invention.
Figure 3:
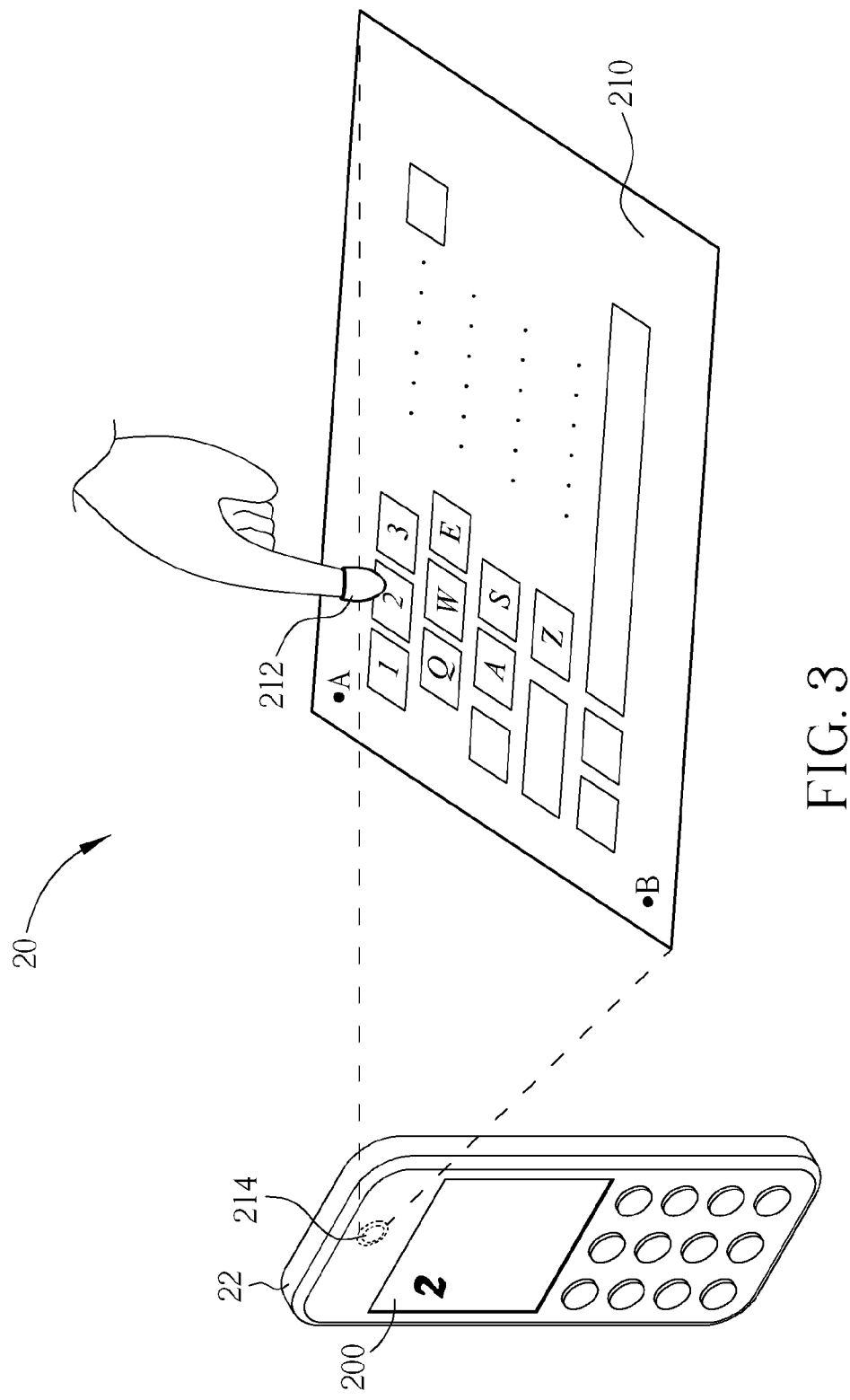
FIG. 3 is a diagram illustrating that the electronic device in FIG. 2 is in use.

Please refer to FIG. 2 and FIG. 3. FIG. 2 is a block diagram of an electronic device 20 according to an embodiment of the present invention, and FIG. 3 is a diagram illustrating how the electronic device 20 is used. The electronic device 20 can be a mobile phone, a personal digital assistant or a computer. The electronic device 20 comprises a main body 22, an input device 210 and a control device 212. The input device 210 and the control device 212 are installed outside of the main body 22, and are parts of an input system 204 of the electronic device 20. The main body 22 comprises a screen 200, a signal processing unit 202, a camera 214, an image processing unit 216, and a memory 218. The input system 204 comprises the input device 210, the control device 212, the camera 214, and the image processing unit 216. Note that, the input system of the conventional electronic device 10 in FIG. 1 is merely the keyboard 104. The most significant difference between the electronic device 20 and the conventional electronic device 10 is the input system.

Briefly, the present invention uses an input device which is installed outside of the main body 22 as the input device of the electronic device 20, uses image processing methods to analyze an image of the input device 210 in use, and transfers the image as input data. As in FIG. 3, the input device 210 may be a graphic keyboard. The graphic keyboard is a keyboard printed on a piece of paper, for example, and keys of the graphic keyboard can be arranged by user preference instead of a standard keyboard layout. The input device 210 includes multiple input units (as keys) and two location symbols, denoted as A and B. Each input unit is denoted by an input symbol, such as an alphabet Q, W, a number 1, 2, or a symbol *, #, etc. In the following description, the input unit which is denoted by 1 is called the input unit 1 and so forth. The location symbols A and B should be recognized by the image processing unit 216 when they are shown in an image, which is described in detail later. Please note that color of the input units, the location symbols and the input symbols should be made different from the surroundings, such that the image processing unit 216 can recognize locations of the input units, location symbols and the input symbol according to the color difference. For example, each input unit of the input device 210 (which is a graphic keyboard) can be distinguished according to a frame surrounding the input unit, or according to a solid colored square whose color is different from the surroundings, wherein an input symbol is in the colored square.

Please refer to FIG. 2 and FIG. 3 again. In FIG. 3, the control device 212 is a finger glove worn on a finger for pressing the input device 210. The control device 212 is made of an LED circuit comprising a power VIN, a diode D which may be a light emitting diode, a resistor R, and a switch SW, as illustrated in FIG. 2. When the user uses the control device 212 to press one of the input units, the switch SW is turned on such that the LED circuit may become a closed loop circuit, and therefore the diode D generates a colored light source, which is the indication signal. The indication signal should be recognized by the image processing unit 216. In detail, color of the indication signal in the image can be differentiated from the surroundings in the image, so that the image processing unit 216 can recognize a location of the pressed input unit. On the other hand, when the control device 212 leaves the pressed input unit, the switch SW is turned off, the LED circuit may become an open loop circuit in which no current flows, and therefore the diode D does not generate the colored light source. In other words, the indication signal is not generated. From the above, through the action of the user pressing the input unit, the control device 212 generates the indication signal so that the image processing unit 216 recognizes the location of the pressed input unit. Generally, the control device 212 is a lighting device, which is not limited in the LED circuit. In another embodiment, the control device used for pressing the input device can be another device, which is described later.

The camera 214 is utilized for taking an image of the user using the control device 212 to press the input device 210, as shown in FIG. 3. The image processing unit 216 is coupled to the camera 214 and is utilized for analyzing the image taken by the camera 214, for recognizing the pressed input unit, generating input data corresponding to an input symbol denoting the pressed input unit, and outputting the input data to the signal processing unit 202. The signal processing unit 202 is coupled to the screen 200 and the image processing unit 216, and is utilized for processing the input data generated by the image processing unit 216 for generating a processing result. Therefore, the processing result, such as words displaying or pages switching, is displayed on the screen 200. Please refer to FIG. 1. The keyboard 104 is installed in the main body of the electronic device 10 and input data outputted to the signal processing unit 102 is directly generated by the keyboard 104. Compared with the prior art, the input device 210 is installed outside of the main body 22, and the input data is generated by the image processing unit 216 after analyzing the image taken by the camera 214. Therefore, design of the appearance and the input method of the electronic device 20 become more flexible.

Operation of the image processing unit 216 is given as follows. Please note that, before the user uses the control device 212 to press the input device 210, the camera 214 also takes an image of the input device 210, and the image processing unit 216 recognizes the location symbols A, B, and each input unit and its corresponding input symbol by analyzing the image of the input device 210. Please refer to FIG. 4, which is a diagram of the input device 210. In detail, the image processing unit 216 recognizes locations of the location symbols A and B according to color difference between the location symbols A and B and the surroundings in the image. The image processing unit 216 also recognizes each input unit according to color difference between a frame of each input unit and the surroundings in the image. After recognizing each input unit, the image processing unit 216 takes one corner of the frame of each input unit, such as a upper-left corner, as a coordinate of each input unit. Also, the image processing unit 216 recognizes each input symbol according to color difference between a boundary of each input symbol and the surroundings in the image, and then associates each input unit to a corresponding input symbol.

Figure 4:
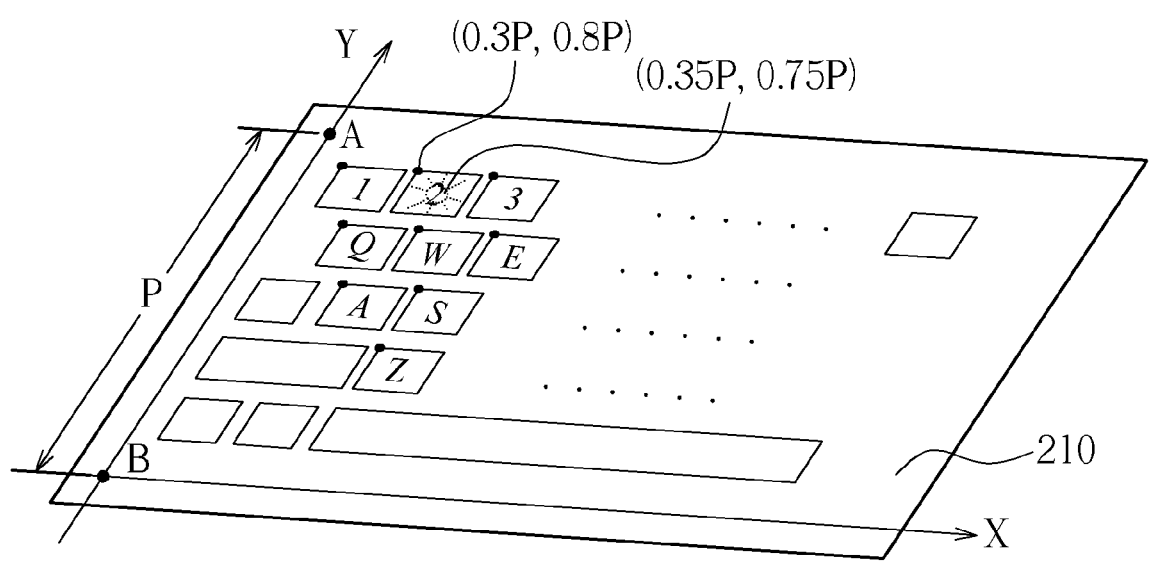
FIG. 4 is a diagram of the input device in FIG. 3.

How the coordinates of each input unit are defined is as follows. First, the image processing unit 216 establishes a coordinate system based on the location symbols A and B. The image processing unit 216 connects the location symbols A and B to form a Y-axis, takes the location symbol B to be an origin point, and forms an X-axis perpendicular to the Y-axis on the plane of the image. Note that, the positive/negative direction of the X-axis and the Y-axis is not limited to the example illustrated in FIG. 4. After the coordinate system is established, the image processing unit 216 takes a distance P between the location symbols A and B to be a unit distance, defines the coordinate of each input unit according to the unit distance, and associates the coordinate of each input unit to a corresponding input symbol. Please note that taking the upper-left corner of the frame of the input unit to be the coordinate is only one embodiment, and the coordinates of each input unit can also be coordinates of a center point of each input unit. For example, as shown in FIG. 4, the coordinates of the input unit 2 are defined as (0.3P, 0.8P), which is the upper-left corner of the frame of the input unit 2, corresponding to the input symbol "2". The image processing unit 216 stores coordinates of all input units and corresponding input symbols in the memory 218.

The above coordinates definition and input symbol recognition operations are performed at the same time when the camera 214 is taking the image of the input device 210, and are not performed manually by the user. Using current image processing techniques, the image processing unit 216 has enough processing power to complete the operations of coordinates definition and input symbol recognition before the user starts pressing the input device, and also to store all coordinates and corresponding input symbols into the memory 218. When the user uses the control device 212 to generate the input data, at the same time, the camera 214 takes continuous images of the user using the control device 212 to press the input device 210.

Note that, in the image of the user using the control device 212 to press the input device 210, the input device 210 and the indication signal generated by the control device 212 are included, where the indication signal is shown as a colored point. The image processing unit 216 recognizes the pressed input unit according to locations of the location symbols A and B and the indication signal, so as to generate the input data corresponding to the input symbol which denotes the pressed input unit. In detail, the image processing unit 216 recognizes the indication signal in the image according to color difference between the colored point and the surroundings and obtains the coordinates of the indication signal according the coordinate system defined by the location symbols A and B. For the reason that the coordinate of each input unit is already defined to be the upper-left corner of each input unit, the image processing unit 216 takes coordinates which are in the upper-left direction and closest to the coordinates of the indication signal to be the coordinates of the pressed input unit. For example, coordinates of each input unit included in the input device 210 comprising N input units are defined as $(X_n, Y_n)$, $1 \leq n \leq N$, and the coordinates of the indication signal are defined as $(x, y)$. The image processing unit 216 takes coordinates which are in the upper-left direction and closest to the coordinates of the indication signal to be the coordinates of the pressed input unit. In other words, the image processing unit 216 ignores those coordinates in which $X_n > x$ or $Y_n < y$, and takes the coordinates which are closest to the coordinates $(x, y)$ among sets of coordinates in which each set of coordinates meets the criteria of $X_n \leq x$ and $Y_n \geq y$, to be the coordinates of the pressed input unit.

As shown in FIG. 4, for example, the coordinates of the indication signal are defined as (0.35P, 0.75P), where P is a unit distance. The image processing unit 216 takes the coordinates (0.3P, 0.8P) to be the coordinates of the pressed input unit, which is in the upper-left direction and is the closest to the coordinates (0.35P, 0.75P) corresponding to the input unit 2. Therefore, the image processing unit 216 recognizes that the input unit 2 is pressed and generates input data corresponding to the input symbol "2", such as hex data "000002", outputted to the signal processing unit 202. The signal processing unit 202 processes the input data and outputs the processing result to the screen 200, so that the screen 200 displays "2", as shown in FIG. 3. For another example, the image processing unit 216 can also define coordinates of an upper-right corner of each input unit to be the coordinates for each input unit. As the image processing unit 216 recognizes the pressed input unit, the image processing unit 216 ignores those coordinates in which $X_n < x$ or $Y_n < y$, and takes the coordinates which are closest to the coordinates $(x, y)$ among sets of coordinates in which each set of coordinates meets the criteria of $X_n \geq x$ and $Y_n \geq y$, to be the coordinates of the pressed input unit. Please note that the mentioned operations of the pressed input unit recognition are two embodiments of the present invention; any other operations made in reference to the locations of the location symbols A, B, and the indication signal should be covered in the present invention.

The electronic device 20 shown in FIG. 2 and FIG. 3 is one embodiment of the present invention. In another embodiment, it is not necessary to install the camera 214 in the main body 22 of the electronic device 20. The camera 214 can also be independent of the main body 22 and connect with the main body 22, such as an external web camera. In addition, as long as the resolution of the image processing unit 216 is enough to analyze the image taken by the camera 214, the distance from the camera 214 to the input device 210 does not need to be fixed, and the shooting angle for the camera 214 to take the image of the input device 210 does not need to be fixed either. In another embodiment, the input device 210 can be a solid keyboard, such as a keyboard generally used with a desktop computer or a telephone set, instead of a graphic keyboard. In this situation, the user is not required to use the control device 212 to generate the indication signal, and can directly press the keys of the solid keyboard. The pressed input unit is recognized by the shifting of its coordinates. Note that, whether the graphic keyboard or the solid keyboard is used, the location symbols A and B can be hand-drawn, printed, or can be any two coordinates randomly selected by the image processing unit 216 according to the image taken by the camera 214.

Figure 5:
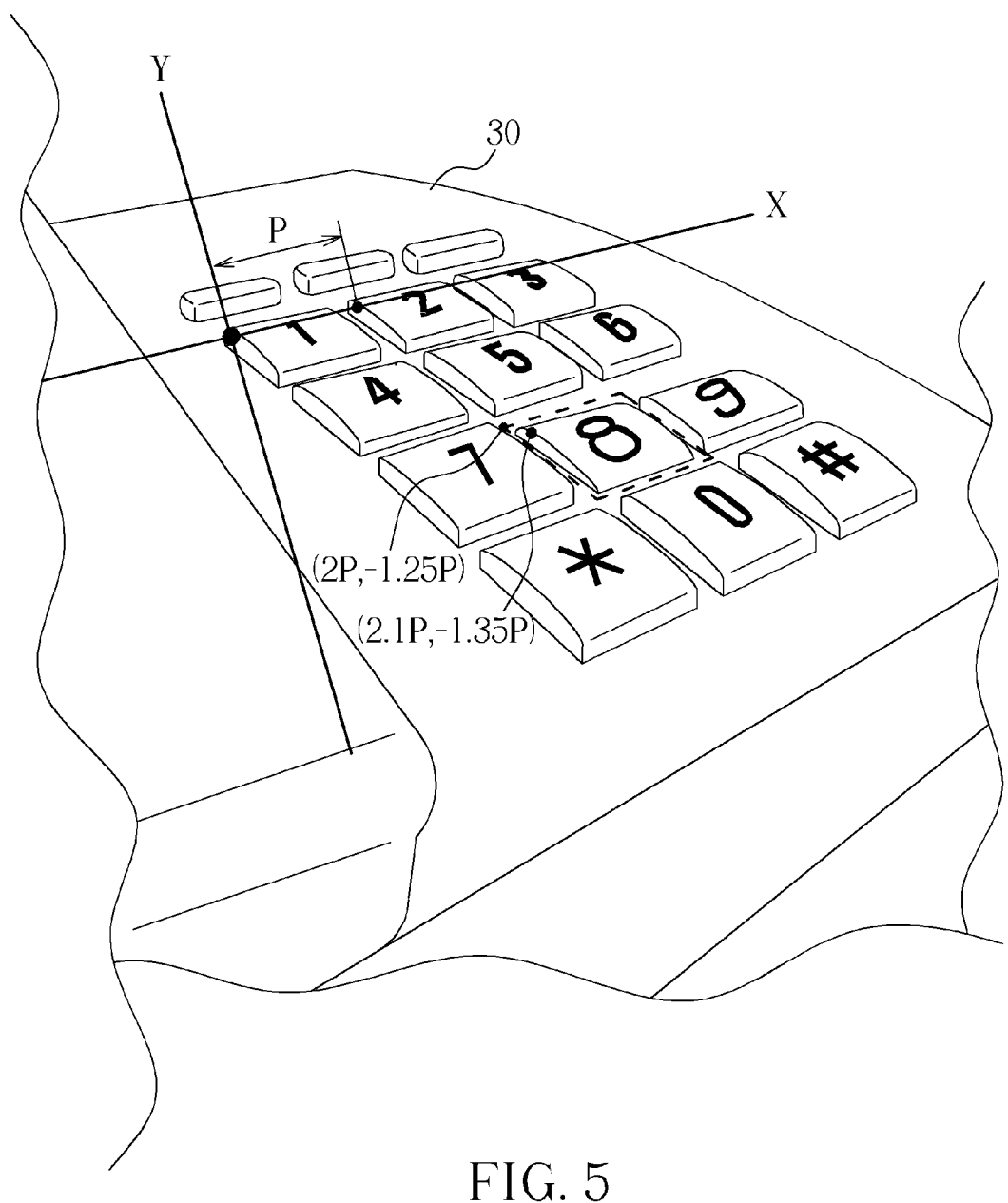
FIG. 5 is a diagram of an input device according to an embodiment of the present invention.

Please refer to FIG. 5, which is a diagram of an input device 30 according to an embodiment of the present invention. The input device 30 is a solid keyboard of a telephone set, which replaces the input device 210 and is used as an input device of the electronic device 20. When the camera 214 takes an image of the input device 30, the image processing unit 216 simultaneously recognizes each input unit according to color difference of the frame of each input unit and the surroundings in the image, and takes an upper-left corner of a frame of each input unit as coordinates of each input unit. Also, the image processing unit 216 recognizes an input symbol of each input unit according to the color difference of the boundary of each input symbol and the surroundings, and then generates the corresponding input data. Please note that the location symbols used to establish the coordinate system for the input device 30 are coordinates of the input unit 1 and the input unit 2, which are randomly selected by the image processing unit 216; no location symbols are denoted in the input device 30. The distance between the coordinates of the input unit 1 and the coordinates of the input unit 2 is regarded as a unit distance P. When the input unit 8 is not yet pressed, the coordinates of the input unit 8 are (2P, −1.25P), which are coordinates of an upper-left corner of a frame depicted by a dashed line in FIG. 5. When the user presses the input unit 8, the image processing unit 216 recognizes that the frame of the input unit 8 moves from the dashed-line frame to the solid-line frame, and the coordinates of the input unit 8 move from (2P, −1.25P) to (2.1P, −1.35P). In other words, the image processing unit 216 recognizes the pressed input unit according to the shift of the coordinates of the input unit instead of the indication signal. Note that, in the situation that the image processing unit 216 has no way to detect the shift of the coordinates of the input unit, e.g. the shooting direction of the camera 214 is perpendicular to the plane of the solid keyboard, the image processing unit 216 can only recognize the pressed input unit according to the indication signal.

Figure 6:
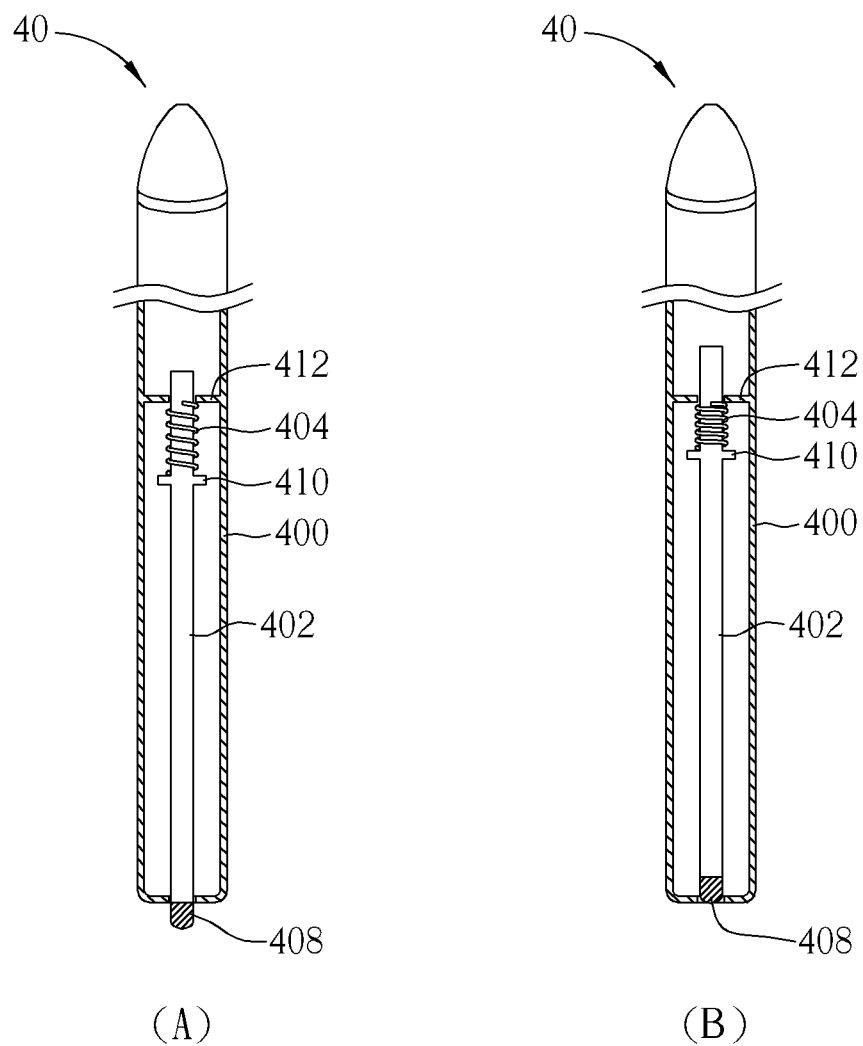
FIG. 6A and FIG. 6B are schematic diagrams of a control device according to an embodiment of the present invention.

Please refer to FIG. 6A and FIG. 6B, which are schematic diagrams of a control device 40 according to an embodiment of the present invention. The control device 40 is a stylus pen, and can be inserted into an open hole of the electronic device 20, which is used for pressing the input device 210, similar to the control device 212. The control device 40 comprises an outer tube 400, an inner tube 402, an elastic component 404, and an end 408. The end 408 is utilized for pressing the input device 210, which connects with the inner tube 402 and is selectively hidden in or exposed to the outer tube 400. The color of the end 408 is different from its surroundings, e.g. the outer tube 400 and the input device 210, so that the image processing unit 216 recognizes the end 408 in the image of the user pressing the input device 210. The inner tube 402 is installed in the outer tube 400 and through the elastic component 404. The elastic component 404 is placed in the outer tube 400, between a stopper 410 of the inner tube 402 and a stopper 412 of the outer tube 400.

When the user uses the control device 40 to press the input device 210, as shown in FIG. 6B, the end 408 receives a reacting force from the input device 210, such that the stopper 410 pushes the elastic component 404, and therefore the elastic component 404 is shortened, hiding the end 408 in the outer tube 400. Next, when the control device 40 leaves the input device 210, as shown in FIG. 6A, the elastic component 404 is released and the end 408 is exposed as it is pushed out of the outer tube 400; in other words, the colored end 408 can be seen in the image taken by the camera 214. From the above, the exposure of the end 408 in the image is the indication signal, and the image processing unit 216 recognizes the pressed input unit according to the indication signal.

Briefly, before the user presses the input device 210, the camera 214 takes the image of the input device 210 and the image processing unit 216 recognizes the location of each input unit and corresponding input symbol. When the user presses the input device 210, the camera 214 takes a continuous image of the user using the control device 212 to press the input device 210. The image processing unit 216 analyzes the image so as to recognize the pressed input unit. In a conventional electronic device, such as a mobile phone, a keyboard installed in a main body of the electronic device is the primary input system. In comparison, the electronic device 20 takes the input device 210 installed outside the main body 22, the control device 212, the camera 214 and the image processing unit 216 to implement the input system 204 of the electronic device 20. Because the input device 210 is not installed in the electronic device 20 and can be the graphic keyboard or the solid keyboard of another device, design of the appearance of the electronic device 20 becomes more flexible, and size of the electronic device 20 may be reduced. Therefore, the electronic device 20 can be made as small as possible. In addition, in the embodiment of the present invention, composite keys are allowed. In this situation, the image taken by the camera 214 may include several indication signals, and the image processing unit 216 may recognize the pressed input units according to locations of the indication signals (or recognize the pressed input units according to the shift of the coordinates of the pressed input units) so as to generate multiple input data corresponding to the pressed input units. Then, the signal processing unit 202 processes the multiple input data and the processing result is displayed on the screen 200.

Figure 7:
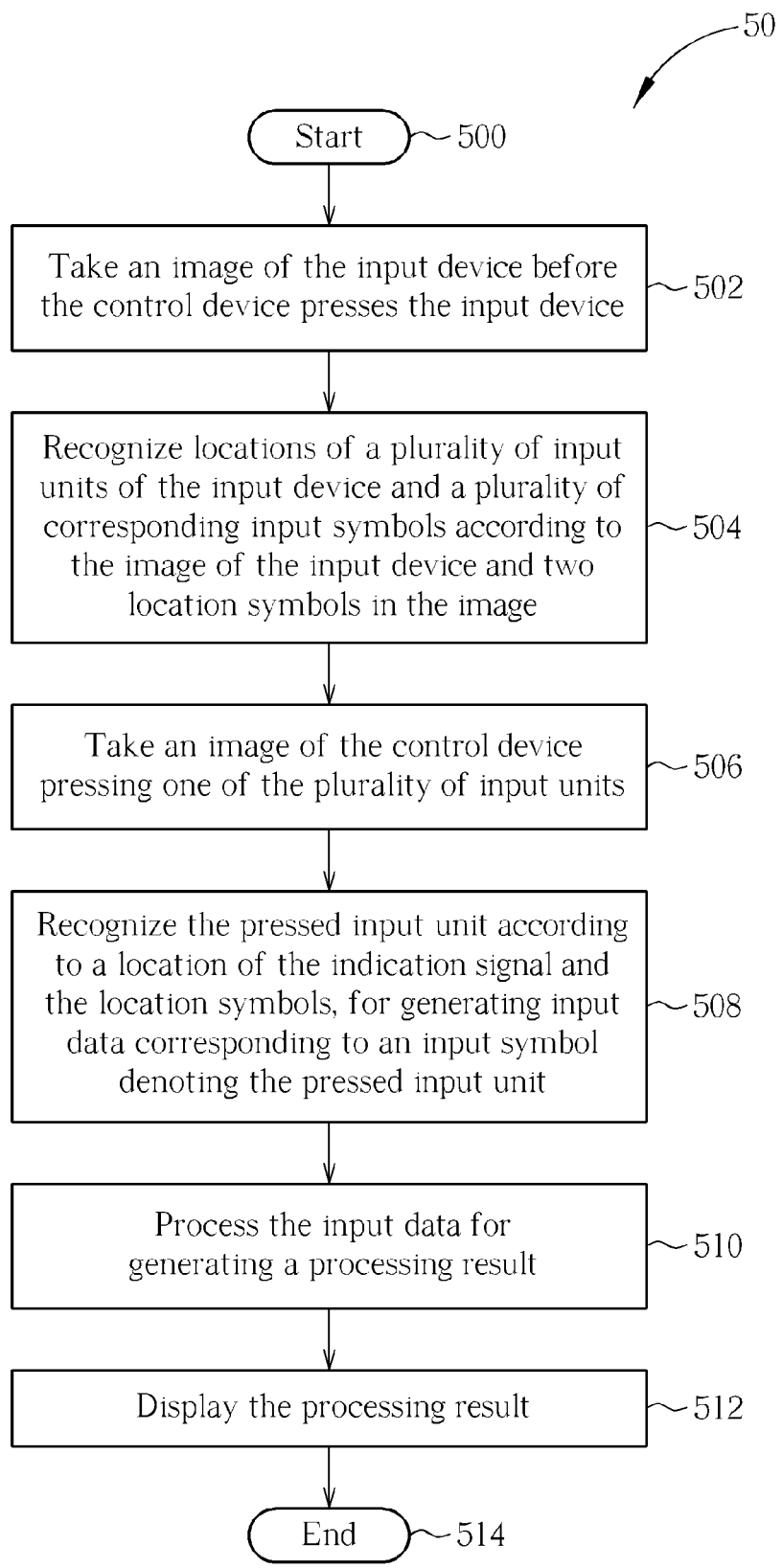
FIG. 7 is a flowchart of a process according to an embodiment of the present invention.

Please refer to FIG. 7, which is a flowchart of a process 50 according to an embodiment of the present invention. The process 50 illustrates the operations of the electronic device 20, and comprises the following steps:

Step 500: Start.

Step 502: The camera 214 takes an image of the input device 210 before the control device presses the input device 210.

Step 504: The image processing unit 216 recognizes locations of a plurality of input units of the input device 210 and a plurality of corresponding input symbols according to the image of the input device 210 and two location symbols in the image.

Step 506: The camera 214 takes an image of the control device 212 pressing one of the plurality of input units.

Step 508: The image processing unit 216 recognizes the pressed input unit according to a location of the indication signal and the location symbols, for generating input data corresponding to an input symbol denoting the pressed input unit.

Step 510: The signal processing unit 202 processes the input data for generating a processing result.

Step 512: The screen 200 displays the processing result.

Step 514: End.

In the process 50, at the beginning, the camera 214 takes an image of the input device 210, and the image processing unit 216 recognizes the location of each input unit and corresponding input symbol. Therefore, after the user uses the control device 212 to press the input device 210, the image processing unit 216 can recognize the pressed input unit according the location of the indication signal and the location symbols A and B, and generates input data accordingly. Finally, the processing result generated by the signal processing unit 202 is displayed on the screen 200. Please note that Step 502 to Step 508 are operations of the input system 204. Please refer to the operations described previously which correspond to Step 502 to Step 508, which are not described again herein.

In conclusion, the present invention uses the input device installed outside of the main body of the electronic device, the control device for pressing the input device, the camera, and the image processing unit installed in the main body of the electronic device to be the input system. Compared with the prior art, the present invention can use different input devices, such as a graphic keyboard or a solid keyboard of another device, to be the user interface. Therefore, the size of the electronic device is reduced and the design for the appearance of the electronic device is more flexible.

Those skilled in the art will readily observe that numerous modifications and alterations of the device and method may be made while retaining the teachings of the invention.

What is claimed is:

1. An input system for an electronic device including a main body, the input system comprising:
    an input device installed outside of the main body, comprising two location symbols and a plurality of input units denoted by a plurality of corresponding input symbols;
    a control device installed outside of the main body, for pressing at least one of the plurality of input units for generating an indication signal;
    a camera installed on the main body and independent to the input device, for taking an image of the control device pressing the input unit, the image including the indication signal, and for taking an image of the input device before the control device presses the input device; and
    an image processing unit installed in the main body and coupled to the camera, for recognizing the pressed input unit according to locations of the indication signal and the two location symbols in the image and generating input data corresponding to an input symbol denoting the pressed input unit;
    wherein the input device exists when the electronic device is in power-off state;
    wherein the input device is a hand-drawn keyboard or a solid keyboard;
    wherein the control device comprises:
        an outer tube comprising a first stopper;
        an inner tube placed in the outer tube, the inner tube comprising a second stopper;
        an end connecting to the inner tube, the end having a color different from the outer tube, and capable of being hidden inside the outer tube or being exposed outside the outer tube; and
        an elastic component placed between the first stopper and the second stopper, the inner tube being disposed through the elastic component, for controlling the end to be hidden inside the outer tube or be exposed outside the outer tube;

wherein the indication signal is generated according to a color variation in the image of the control device pressing the input unit due to a variation between the end hidden inside the outer tube and exposed outside the outer tube.

2. The input system of claim 1, wherein the image processing unit is further utilized for recognizing locations of the plurality of input units and the plurality of input symbols according to the image of the input device and two location symbols in the image.

3. The input system of claim 1, wherein locations of the two location symbols are coordinates in the image randomly obtained by the image processing unit.

4. The input system of claim 1, wherein the control device comprises a lighting device from which the indication signal is generated.

5. The input system of claim 4, wherein the lighting device is a light emitting diode.

6. The input system of claim 1, wherein the input device is a graphic keyboard.

7. An electronic device comprising:
- a screen installed in a main body of the electronic device for displaying images;
- a signal processing unit, installed in the main body and coupled to the screen, for processing input data and generating a processing result, and outputting the processing result to the screen; and
- an input system coupled to the signal processing unit, comprising:
  - an input device installed outside of the main body, comprising two location symbols and a plurality of input units denoted by a plurality of corresponding input symbols;
  - a control device installed outside of the main body, for pressing at least one of the plurality of input units for generating an indication signal;
  - a camera installed on the main body and independent to the input device, for taking an image of the control device pressing the input unit, the image including the indication signal, and for taking an image of the input device before the control device presses the input device; and
  - an image processing unit installed in the main body, coupled to the camera and the signal processing unit, for recognizing the pressed input unit according to locations of the indication signal and the two location symbols in the image, generating input data corresponding to an input symbol denoting the pressed input unit, and outputting the input data to the signal processing unit;
- wherein the input device exists when the electronic device is in power-off state;
- wherein the input device is a hand-drawn keyboard or a solid keyboard;
- wherein the control device comprises:
  - an outer tube comprising a first stopper;
  - an inner tube placed in the outer tube, the inner tube comprising a second stopper;
  - an end connecting to the inner tube, the end having a color different from the outer tube, and capable of being hidden inside the outer tube or being exposed outside the outer tube; and
  - an elastic component placed between the first stopper and the second stopper, the inner tube being disposed through the elastic component, for controlling the end to be hidden inside the outer tube or be exposed outside the outer tube;

wherein the indication signal is generated according to a color variation in the image of the control device pressing the input unit due to a variation between the end hidden inside the outer tube and exposed outside the outer tube.

8. The electronic device of claim 7, wherein the image processing unit is further utilized for recognizing locations of the plurality of input units and the plurality of input symbols according to the image of the input device and two location symbols in the image.

9. The electronic device of claim 7, wherein locations of the two location symbols are coordinates in the image randomly obtained by the image processing unit.

10. The electronic device of claim 7, wherein the control device comprises a lighting device from which the indication signal is generated.

11. The electronic device of claim 10, wherein the lighting device is a light emitting diode.

12. The electronic device of claim 7, wherein the input device is a graphic keyboard.

13. An input method for an electronic device, the electronic device comprising an input device including two location symbols and a plurality of input units denoted by a plurality of corresponding symbols, the input method comprising:
- using a control device to press at least one of the plurality of input units, for generating an indication signal;
- using a camera installed on a main body of the electronic device and independent to the input device to take an image of the control device pressing the input unit, the image including the indication signal, and to take an image of the input device before the control device presses the input device; and
- recognizing the pressed input unit according to locations of the indication signal and the two location symbols in the image, for generating input data corresponding to an input symbol denoting the pressed input unit;
- wherein the input device exists when the electronic device is in power-off state;
- wherein the input device is a hand-drawn keyboard or a solid keyboard;
- wherein the control device comprises:
  - an outer tube comprising a first stopper;
  - an inner tube placed in the outer tube, the inner tube comprising a second stopper;
  - an end connecting to the inner tube, the end having a color different from the outer tube, and capable of being hidden inside the outer tube or being exposed outside the outer tube; and
  - an elastic component placed between the first stopper and the second stopper, the inner tube being disposed through the elastic component, for controlling the end to be hidden inside the outer tube or be exposed outside the outer tube;
- wherein the indication signal is generated according to a color variation in the image of the control device pressing the input unit due to a variation between the end hidden inside the outer tube and exposed outside the outer tube.

14. The input method of claim 13 further comprising recognizing locations of the plurality of input units and the plurality of input symbols according to the image of the input device and two location symbols in the image.

15. The input method of claim 13, wherein locations of the two location symbols are coordinates in the image randomly obtained by the image processing unit.

16. The input method of claim 13, wherein the control device comprises a lighting device from which the indication signal is generated.

17. The input method of claim 16, wherein the lighting device is a light emitting diode.

18. The input method of claim 13, wherein the input device is a graphic keyboard.

* * * * *